US011549386B2

(12) United States Patent
Tamada

(10) Patent No.: US 11,549,386 B2
(45) Date of Patent: Jan. 10, 2023

(54) GAS TURBINE GENERATOR

(71) Applicant: HONDA MOTOR CO., LTD., Tokyo (JP)

(72) Inventor: Shunichiro Tamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/686,450

(22) Filed: Mar. 4, 2022

(65) Prior Publication Data

US 2022/0298925 A1    Sep. 22, 2022

(30) Foreign Application Priority Data

Mar. 17, 2021 (JP) .............................. JP2021-043350

(51) Int. Cl.
*F01D 15/10* (2006.01)
*F01D 17/14* (2006.01)
*B64D 27/02* (2006.01)

(52) U.S. Cl.
CPC ........... *F01D 15/10* (2013.01); *F01D 17/145* (2013.01); *B64D 2027/026* (2013.01); *F05D 2220/76* (2013.01); *F05D 2240/35* (2013.01); *F05D 2260/4023* (2013.01); *F05D 2260/43* (2013.01); *F05D 2260/60* (2013.01)

(58) Field of Classification Search
CPC . B64D 2027/026; F01D 15/10; F01D 17/145; F05D 2220/76; F05D 2240/35; F05D 2260/4023; F05D 2260/43; F05D 2260/60; Y02T 50/60; F02C 6/00
See application file for complete search history.

(56) References Cited

U.S. PATENT DOCUMENTS

| | | | |
|---|---|---|---|
| 9,493,245 B2 | 11/2016 | Salyer | |
| 2013/0241203 A1* | 9/2013 | Kleen | ..................... F01D 15/10 290/52 |
| 2019/0017443 A1* | 1/2019 | Eifert | .................. F41H 13/0043 |
| 2020/0023982 A1* | 1/2020 | Kupratis | ................... F02C 7/36 |
| 2020/0173301 A1* | 6/2020 | Razak | ..................... F01D 13/02 |
| 2022/0120223 A1* | 4/2022 | Tamada | .................... F02C 9/18 |
| 2022/0298970 A1* | 9/2022 | Tamada | .................... F23R 3/16 |

* cited by examiner

*Primary Examiner* — Jesse S Bogue
(74) *Attorney, Agent, or Firm* — Amin, Turocy & Watson, LLP

(57) ABSTRACT

The gas turbine generator includes: a first gas turbine element 2; a second gas turbine element 3; a single combustor 4 connected to the gas turbine elements 2 and 3; a first supply pipe 51 that connects the first compressor 21 to the combustor 4; a second supply pipe 52 that connects the second compressor 31 to the combustor 4; a first discharge pipe 53 that connects the combustor 4 to the first turbine 22; a second discharge pipe 54 that connects the combustor 4 to the second turbine 32; and a flywheel 7 that is connected to at least one of the first rotation shaft 23 and the second rotation shaft 33 and absorbs a torque fluctuation generated in the connected gas turbine element.

7 Claims, 3 Drawing Sheets

GAS TURBINE GENERATOR

CROSS-REFERENCE TO RELATED APPLICATION

Priority is claimed on Japanese Patent Application No. 2021-043350 filed Mar. 17, 2021, the content of which is incorporated herein by reference.

BACKGROUND OF THE INVENTION

Field of the Invention

The present invention relates to a gas turbine generator.

Description of Related Art

Conventionally, various techniques for gas turbine generators in which a generator is connected to a compressor or a turbine mounted on an airframe of an aircraft or the like and electric power from the generator is used to drive a plurality of propellers are proposed.

For example, Patent Document 1 (U.S. Pat. No. 9,493,245) discloses a configuration of a multi-type gas turbine generator including a plurality of gas turbine engines, generators that generate electric power by operating the gas turbine engines, and a battery that supplies electric power to motors of propellers. By operating either the gas turbine engines or the battery, electric power generated by the gas turbine engines operates the motors. According to the technique described in Patent Document 1, by forming a hybrid-type gas turbine generator in which the gas turbine engines and the battery are combined, it can cope with various situations such as a failure of the gas turbine engines.

SUMMARY OF THE INVENTION

Incidentally, in such a hybrid-type gas turbine generator, loads of the propellers may fluctuate due to, for example, disturbance caused by outside air during flight. In addition, fluctuating loads may be generated when control of a posture is performed during hovering. Conventionally, in order to quickly follow these fluctuating loads, the electric power of the battery is used to cope with the fluctuating loads. For this reason, in conventional technique, it is necessary to increase a size of the battery in order to store a sufficient amount of electric power to cope with the fluctuating loads. As a result, there is a risk that a weight of the battery will increase.

In particular, in the technique described in Patent Document 1 having the plurality of gas turbine engines, since each of the plurality of gas turbine engines has a generator, there is a risk that the weight of the entire battery will further increase.

Thus, an object of the present invention is to provide a gas turbine generator in which a battery can be made smaller and a weight of a battery can be reduced as compared with conventional technique.

In order to solve the above problems, a gas turbine generator according to the present invention has the following configuration.

(1) A gas turbine generator according to one aspect of the present invention is a gas turbine generator, which is mounted on an airframe of an aircraft having a hybrid propulsion system including a plurality of rotors that are connected to a generator to drive the generator and driven by electric power generated by the generator, includes: a first gas turbine element including a first compressor, a first turbine that rotates integrally with the first compressor, a first rotation shaft that connects the first compressor to the first turbine, and a first generator that is connected to the first rotation shaft and disposed between the first compressor and the first turbine; a second gas turbine element including a second compressor, a second turbine that rotates integrally with the second compressor, a second rotation shaft that connects the second compressor to the second turbine, and a second generator that is connected to the second rotation shaft and disposed between the second compressor and the second turbine; a single combustor connected to the first gas turbine element and the second gas turbine element; a first supply pipe that connects the first compressor to the combustor and allows air compressed by the first compressor to flow into an intake port of the combustor; a second supply pipe that connects the second compressor to the combustor and allows air compressed by the second compressor to flow into the intake port of the combustor; a first discharge pipe that connects the combustor to the first turbine and allows combustion gas discharged from the combustor to flow into the first turbine; a second discharge pipe that connects the combustor to the second turbine and allows combustion gas discharged from the combustor to flow into the second turbine; and a flywheel that is connected to at least one of the first rotation shaft and the second rotation shaft and absorbs torque fluctuation generated in the connected gas turbine element.

(2) The gas turbine generator according to the above aspect (1) may include a first flywheel which is connected to the first rotation shaft and absorbs torque fluctuation that is generated in the first gas turbine element, and a second flywheel which is connected to the second rotation shaft and absorbs torque fluctuation that is generated in the second gas turbine element.

(3) The gas turbine generator according to the above aspect (2) may include a first clutch that is provided on the first rotation shaft to switch between a connection state in which the first flywheel and the first rotation shaft are connected to each other and a non-connection state in which the connection between the first flywheel and the first rotation shaft is released, and a second clutch that is provided on the second rotation shaft to switch between a connection state in which the second flywheel and the second rotation shaft are connected to each other and a non-connection state in which the connection between the second flywheel and the second rotation shaft is released, and the first clutch and the second clutch may be placed in the non-connection state when an engine is started.

(4) In the gas turbine generator according to the above aspect (2) or (3), the first flywheel and the second flywheel may be variable flywheels in which a magnitude of a moment of inertia changes.

(5) The gas turbine generator according to any one of the above aspects (1) to (4) may include a first opening and closing valve that is provided to the first supply pipe and capable of blocking the flow of air in the first supply pipe, a second opening and closing valve that is provided to the second supply pipe and capable of blocking the flow of air in the second supply pipe, a third opening and closing valve that is provided to the first discharge pipe and capable of blocking the flow of combustion gas in the first discharge pipe, and a fourth opening and closing valve that is provided to the second discharge pipe and capable of blocking the flow of combustion gas in the second discharge pipe, the aircraft may be switchable between a first operation mode in which required outputs for the first gas turbine element and the second gas turbine element are larger than a predetermined value, and a second operation mode in which the required outputs are smaller than the predetermined value, and in the second operation mode, an operation of either the first gas turbine element or the second gas turbine element is stopped, and the opening and closing valves provided to the supply pipe and the discharge pipe connected to the stopped gas turbine element may be closed.

(6) In the gas turbine generator according to any one of the above aspects (1) to (5), a basic load may be determined in accordance with a flight state of the aircraft, an output for the basic load may be provided by the generated electric power of the first generator and the second generator, and an output for a fluctuating load, which is a difference from the basic load, may be provided by the generated electric power based on the moment of inertia of the flywheel.

(7) A gas turbine generator according to one aspect of the present invention is a gas turbine generator, which is mounted on an airframe of an aircraft having a hybrid propulsion system including a plurality of rotors that are connected to a generator to drive the generator and driven by electric power generated by the generator, includes: a compressor; a turbine that rotates integrally with the compressor; a rotation shaft that connects the compressor to the turbine; a generator connected to the rotation shaft; a combustor connected to the compressor and the turbine; and a flywheel that is connected to the rotation shaft and absorbs torque fluctuation generated by the gas turbine generator, a basic load is determined in accordance with a flight state of the aircraft, an output for the basic load is provided by generated electric power of the generator, and an output for a fluctuating load, which is a difference from the basic load, is provided by the generated electric power based on a moment of inertia of the flywheel.

According to the aspect (1), the gas turbine generator is a multi-type gas turbine generator including two gas turbine elements and a single combustor. Since the plurality of gas turbine elements are connected to the single combustor, the number of parts can be reduced as compared with a conventional technique having a plurality of combustors corresponding to a plurality of gas turbine elements. Thus, it is possible to inhibit an increase in weight of the entire gas turbine generator. By reducing a weight of the gas turbine generator, it is possible to improve fuel efficiency and reduce an unnecessary fuel loss from the battery. Accordingly, the battery can be made smaller.

The gas turbine generator has the flywheel. The flywheel is connected to the rotation shaft and absorbs torque fluctuation (a fluctuating load) that is generated in the connected gas turbine element. The flywheel rotates with the rotation shaft to generate a moment of inertia. For this reason, it is possible to absorb various fluctuating loads generated in the aircraft using the generated electric power based on the moment of inertia of the flywheel. Thus, as compared with conventional technique in which a fluctuating load is absorbed using generated electric power from a battery, it is possible to inhibit unnecessary power consumption of the battery for coping with the fluctuating load. Accordingly, a capacity of the battery can be reduced as compared with conventional technique. As a result, the battery can be made smaller and lighter, and an increase in cost related to the battery can be inhibited. In particular, in a multi-type gas turbine generator including a plurality of gas turbine elements, it is possible to realize a reduction in weight of the entire battery as compared with conventional technique.

Accordingly, it is possible to provide the gas turbine generator in which the battery can be made smaller and the weight of the battery can be reduced as compared with conventional technique.

According to the aspect (2), the gas turbine generator has the first flywheel and the second flywheel. The first flywheel is connected to the first rotation shaft and absorbs the torque fluctuation (fluctuating load) generated in the first gas turbine element. The second flywheel is connected to the second rotation shaft and absorbs the torque fluctuation (fluctuating load) generated in the second gas turbine element. Since the flywheels are provided to each of the plurality of gas turbine elements in this way, the fluctuating loads in the plurality of gas turbine elements can be effectively absorbed. For example, even in a case in which one of the gas turbine elements is stopped, the fluctuating load can be absorbed by the flywheel provided on the operating gas turbine element. Accordingly, particularly in the multi-type gas turbine generator, the gas turbine generator that can cope with various situations can be provided.

According to the aspect (3), the first rotation shaft is provided with the first clutch, and the second rotation shaft is provided with the second clutch. Each clutch can switch between the connection state in which the flywheel and the rotation shaft are connected to each other and the non-connection state in which the connection between the flywheel and the rotation shaft is released. Since contact and non-contact of the flywheels with respect to each rotation shaft can be switched using the clutches, the moment of inertia of the flywheels can be effectively used in accordance with a flight state or the like of the aircraft. Accordingly, versatility of the gas turbine generator can be improved. When the engine is started, each clutch is disconnected. By placing each clutch into a non-contact state, the moment of inertia of each rotation shaft becomes smaller, and thus the gas turbine engine can be easily accelerated. Accordingly, a time required to start the engine can be shortened.

According to the aspect (4), the first flywheel and the second flywheel are variable flywheels in which the magnitude of the moment of inertia changes. Thus, the magnitude of the moment of inertia can be changed in accordance with a magnitude of the fluctuating load and a length of time during which the fluctuating load is generated. Accordingly, it is possible to more accurately cope with fluctuating loads generated in the aircraft. Further, by optimizing the magnitude of the moment of inertia, efficiency of the gas turbine generator can be improved, and unnecessary power consumption of the battery can be further inhibited.

According to the aspect (5), the first supply pipe, the second supply pipe, the first discharge pipe, and the second discharge pipe are provided respectively with the first opening and closing valve, the second opening and closing valve, the third opening and closing valve, and the fourth opening and closing valve. The aircraft can be switched between the first operation mode in which the required output is large and the second operation mode in which the required output is small. Thus, the gas turbine generator can be used in an optimum form, for example, for each of the plurality of operation modes at the time of a high load such as when the aircraft takes off and lands and at the time of a low load such as when the aircraft 10 is cruising. Accordingly, fuel efficiency of the gas turbine generator can be improved as compared with conventional technique.

Particularly in the second operation mode for coping with a low load, one of the two gas turbine elements is stopped. In this case, the opening and closing valve provided in each pipe connected to the stopped gas turbine element is closed.

Thus, by switching the mode to the second operation mode, for example, at the time of the low load such as when the aircraft is cruising, excessive power generation of the battery can be inhibited. Accordingly, the battery can be made smaller and lighter.

According to the aspect (6), the basic load is determined in accordance with the flight state of the aircraft. The output for the basic load is provided by the generated electric power of the first generator and the second generator. The output for the fluctuating load, which is the difference from the basic load, is provided by the generated electric power based on the moment of inertia of the flywheel. Thus, since the fluctuating load can be absorbed only by the flywheel, no battery is required. Accordingly, it can be formed into a battery-less gas turbine generator. This makes it possible to further reduce the weight of the gas turbine generator.

According to the aspect (7), even when being applied to a normal gas turbine generator with a single gas turbine engine and a combustor, it is possible to obtain the same operations and effects as the above-mentioned multi-type gas turbine generator. That is, by absorbing the fluctuating load using the flywheel, the power consumption of the battery can be inhibited and the capacity of the battery can be reduced as compared with conventional technique. As a result, the battery can be made smaller and lighter.

Accordingly, it is possible to provide the gas turbine generator in which the battery can be made smaller and the weight of the battery can be reduced as compared with conventional technique.

DETAILED DESCRIPTION OF THE INVENTION

Embodiments of the present invention will be described below with reference to the drawings.

First Embodiment

Figure 1:
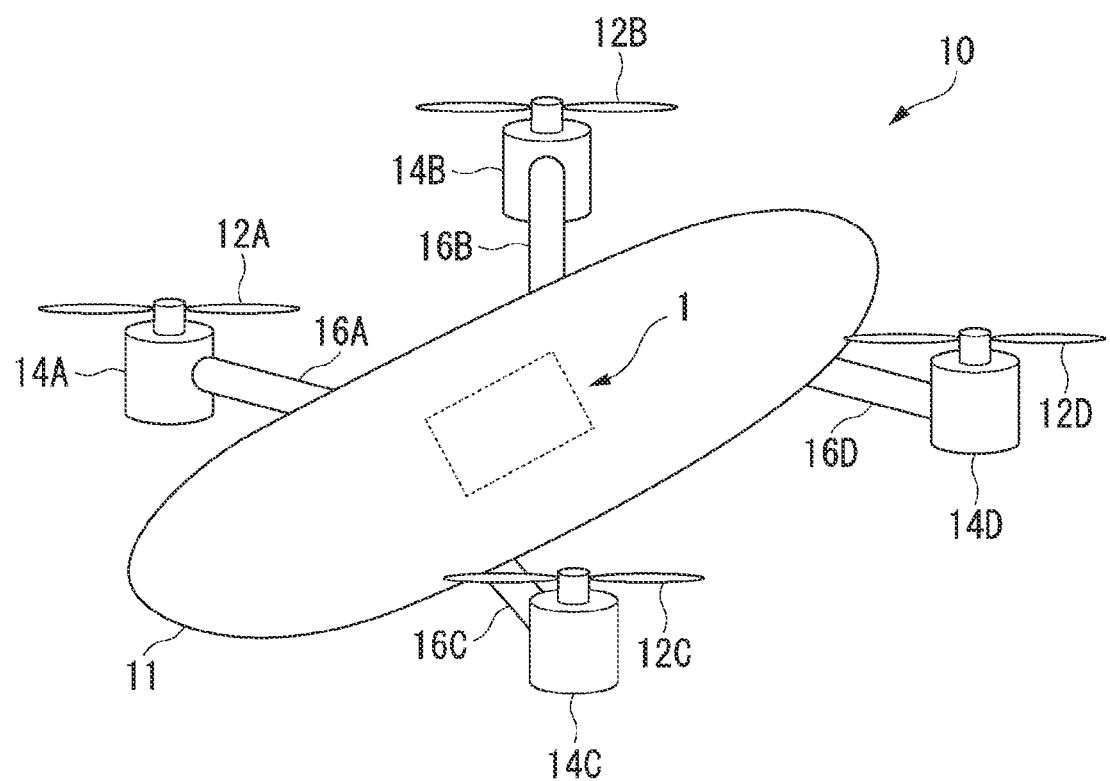
FIG. 1 is an external view of an aircraft on which a gas turbine generator according to a first embodiment is mounted.

FIG. 1 is an external view of an aircraft 10 on which a gas turbine generator 1 according to a first embodiment is mounted.

The aircraft 10 includes, for example, an airframe 11, a plurality of rotors 12A to 12D, a plurality of electric motors 14A to 14D, attachment members 16A to 16D, and a gas turbine generator 1. Hereinafter, in a case in which the plurality of rotors 12A to 12D are not distinguished from each other, the rotors 12A to 12D are referred to as rotors 12, and when the plurality of motors 14A to 14D are not distinguished from each other, the motors 14A to 14D are referred to as motors 14.

The aircraft 10 has a hybrid propulsion system including the plurality of rotors driven by electric power generated by generators 24 and 34, which will be described in detail later.

The rotor 12A is attached to the airframe 11 via the attachment member 16A. The motor 14A is attached to a base portion (a rotation shaft) of the rotor 12A. The motor 14A drives the rotor 12A. The motor 14A is, for example, a brushless DC motor. The rotor 12A is a fixed wing of blades that rotate about an axis parallel to a direction of gravity in a case in which the aircraft 10 is in a horizontal attitude. The rotors 12B to 12D, the attachment members 16B to 16D, and the motors 14B to 14D also have the same functional configurations as described above, and thus the description thereof will be omitted.

The rotor 12 rotates in response to a control signal, and thus the aircraft 10 flies in a desired flight state. The control signal is a signal for controlling the aircraft 10 based on an operation of an operator or an instruction in an autopilot. For example, the rotor 12A and the rotor 12D rotate in a first direction (for example, clockwise), and the rotor 12B and the rotor 12C rotate in a second direction (for example, counterclockwise), and thus the aircraft 10 flies. In addition to the rotors 12 described above, auxiliary rotors for maintaining a posture or for horizontal propulsion (not shown) may be provided.

Figure 2:
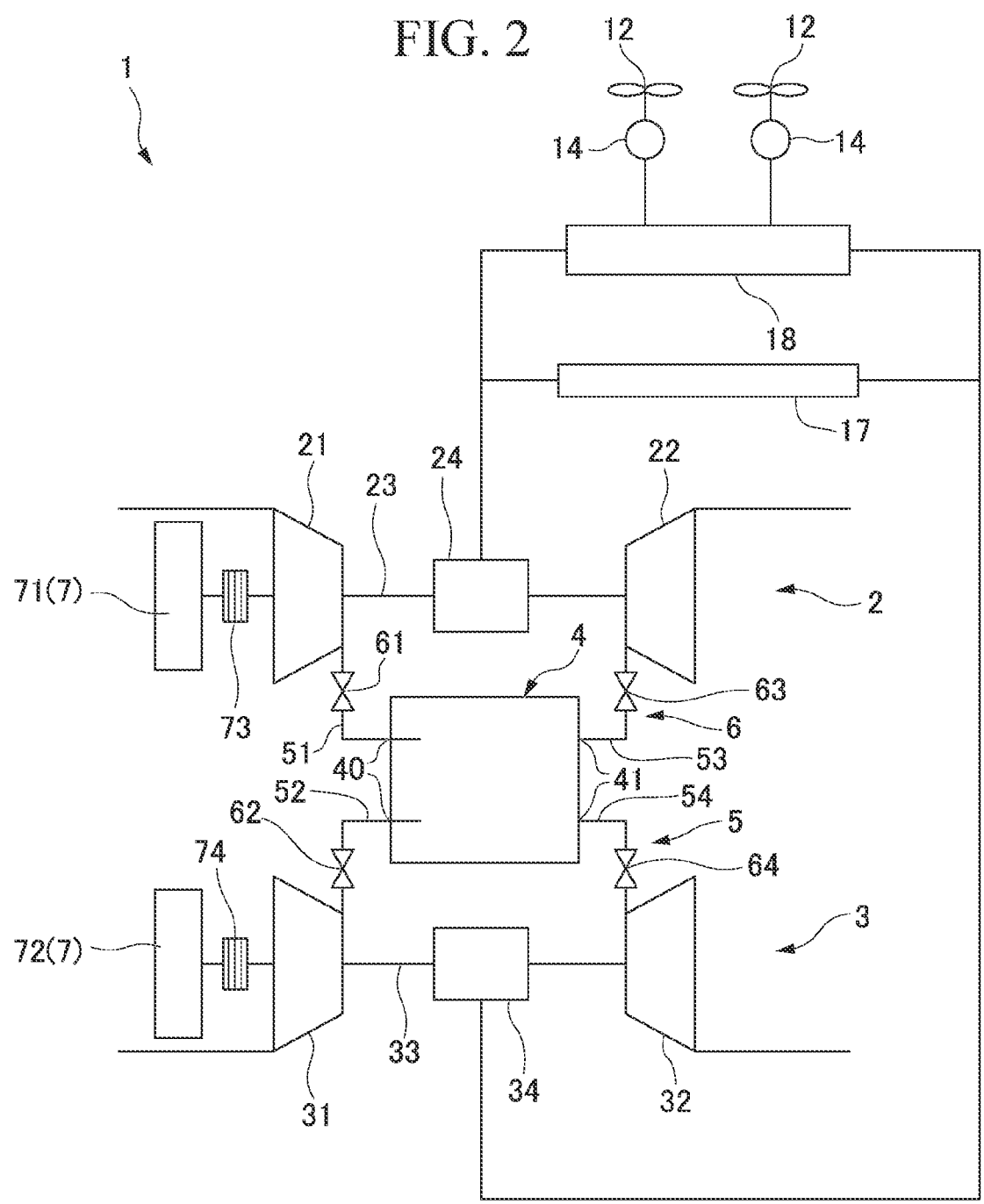
FIG. 2 is a schematic configuration diagram of the gas turbine generator according to the first embodiment.

FIG. 2 is a schematic configuration diagram of the gas turbine generator 1 according to the first embodiment. FIG. 2 is a diagram for explaining an operation of the gas turbine generator 1 in a first operation mode M1 among a plurality of operation modes.

The gas turbine generator 1 is mounted inside the aircraft 10. The gas turbine generator 1 generates electric power that is a power source for driving the rotors 12A to 12D (see FIG. 1) of the aircraft. The gas turbine generator 1 is configured of a so-called gas turbine engine. The gas turbine generator 1 includes a first gas turbine element 2, a second gas turbine element 3, a single combustor 4, a plurality of pipes 5, a plurality of opening and closing valves 6, and a flywheel 7.

(Gas Turbine Elements)

The first gas turbine element 2 has a first compressor 21, a first turbine 22, a first rotation shaft 23, and a first generator 24. The first compressor 21 compresses intake air suctioned from ventilation holes (not shown) provided in the airframe 11 of the aircraft 10. The first turbine 22 is connected to the first compressor 21 and rotates integrally with the first compressor 21. The first rotation shaft 23 connects the first compressor 21 to the first turbine 22. The first rotation shaft 23 extends, for example, in a longitudinal direction of the airframe 11. The first compressor 21 is connected to a front end portion of the first rotation shaft 23. The first turbine 22 is connected to a rear end portion of the first rotation shaft 23.

The first generator 24 is disposed between the first compressor 21 and the first turbine 22 in an axial direction of the first rotation shaft 23. The first generator 24 is provided coaxially with the first rotation shaft 23 and is connected to the first rotation shaft 23 via a reduction mechanism or the like. The first generator 24 generates electric power (alternating current power) by driving the first turbine 22. The alternating current power generated by the first generator 24 is converted into direct current power by a converter of a power drive unit (PDU) (not shown) and stored in a battery 17. Further, discharged electric power from the battery 17 is supplied to the motors 14 via an inverter 18, and thus the motors 14 are driven.

The second gas turbine element 3 is provided side by side with the first gas turbine element 2, for example, in a lateral direction of the airframe 11. A configuration of the second gas turbine element 3 is the same as the configuration of the first gas turbine element 2. That is, the second gas turbine element 3 has a second compressor 31, a second turbine 32, a second rotation shaft 33, and a second generator 34. The second compressor 31 compresses intake air suctioned from ventilation holes (not shown) provided in the airframe 11. The second turbine 32 is connected to the second compressor 31 and rotates integrally with the second compressor 31. The second rotation shaft 33 connects the second compressor 31 to the second turbine 32.

The second generator 34 is disposed between the second compressor 31 and the second turbine 32 in an axial direction of the second rotation shaft 33. The second generator 34 is provided coaxially with the second rotation shaft 33 and is connected to the second rotation shaft 33 via a reduction mechanism or the like. The second generator 34 generates electric power (alternating current power) by driving the second turbine 32. The alternating current power generated by the second generator 34 is converted into direct current power by a converter of a power drive unit (PDU) (not shown) and stored in the battery 17. Also, in the present embodiment, the first generator 24 and the second generator 34 are connected to the common battery 17 to store the electric power, but the first generator 24 and the second generator 34 may be connected to different batteries to store the electric power in the respective batteries.

(Combustor)

One combustor 4 is provided for two gas turbine elements (the first gas turbine element 2 and the second gas turbine element 3). The combustor 4 is disposed between the first gas turbine element 2 and the second gas turbine element 3 in an arrangement direction of the first gas turbine element 2 and the second gas turbine element 3 (the lateral direction of the airframe 11). The combustor 4 is located between the compressors 21 and 31 and the turbines 22 and 32 in the longitudinal direction of the airframe 11. The combustor 4 is connected to the first gas turbine element 2 and the second gas turbine element 3. Compressed air from at least one of the first compressor 21 and the second compressor 31 flows into the combustor 4.

(Plurality of Pipes)

The plurality of pipes 5 have a first supply pipe 51, a second supply pipe 52, a first discharge pipe 53, and a second discharge pipe 54. The first supply pipe 51 connects the first compressor 21 to an intake port 40 of the combustor 4. The first supply pipe 51 allows air compressed by the first compressor 21 to flow into the combustor 4. The second supply pipe 52 connects the second compressor 31 to the intake port 40 of the combustor 4. The second supply pipe 52 allows air compressed by the second compressor 31 to flow into the combustor 4. The first supply pipe 51 and the second supply pipe 52 are formed independently from each other and do not allow mixing of air therebetween.

The first discharge pipe 53 connects a discharge port 41 of the combustor 4 to the first turbine 22. The first discharge pipe 53 allows combustion gas discharged from the combustor 4 to flow into the first turbine 22. The second discharge pipe 54 connects the discharge port 41 of the combustor 4 to the second turbine 32. The second discharge pipe 54 allows combustion gas discharged from the combustor 4 to flow into the second turbine 32. The first discharge pipe 53 and the second discharge pipe 54 are formed independently from each other and do not allow mixing of combustion gas therebetween.

(Plurality of Opening and Closing Valves)

The plurality of opening and closing valves 6 have a first opening and closing valve 61, a second opening and closing valve 62, a third opening and closing valve 63, and a fourth opening and closing valve 64. The first opening and closing valve 61 is provided to the first supply pipe 51 and can be switched to allow or block a flow of air in the first supply pipe 51. The second opening and closing valve 62 is provided to the second supply pipe 52 and can be switched to allow or block a flow of air in the second supply pipe 52. The third opening and closing valve 63 is provided in the first discharge pipe 53 and can be switched to allow or block a flow of combustion gas in the first discharge pipe 53. The fourth opening and closing valve 64 is provided in the second discharge pipe 54 and can be switched to allow or block a flow of combustion gas in the second discharge pipe 54. Each opening and closing valve is, for example, a solenoid valve that opens and closes a valve by switching on or off of energization.

(Flywheel)

The flywheel 7 is connected to at least one of the first rotation shaft 23 and the second rotation shaft 33 and absorbs a torque fluctuation generated in the connected gas turbine element. In the present embodiment, the flywheel 7 has a first flywheel 71 and a second flywheel 72.

The first flywheel 71 is connected to the first rotation shaft 23 and absorbs a torque fluctuation generated in the first gas turbine element 2. The first flywheel 71 is formed in a disc shape coaxial with the first rotation shaft 23. The first flywheel 71 is provided at an end portion of the first rotation shaft 23. Specifically, the first flywheel 71 of the present embodiment is provided at the end portion of the first rotation shaft 23 that protrudes from the first compressor 21 on a side opposite to the first turbine 22. In other words, the first flywheel 71 is provided on the side opposite to the first turbine 22 with respect to the first compressor 21.

A first clutch 73 is provided between the first flywheel 71 and the first compressor 21. The first clutch 73 is provided on the first rotation shaft 23. The first clutch 73 is switched between a connection state in which the first flywheel 71 and the first rotation shaft 23 are connected to each other, and a non-connection state in which the connection between the first flywheel 71 and the first rotation shaft 23 is released. The first clutch 73 is, for example, an electromagnetic clutch. When the electromagnetic clutch is turned on, the first flywheel 71 and the first rotation shaft 23 are connected to each other (connection state). When the electromagnetic clutch is turned off, the connection between the first flywheel 71 and the first rotary shaft 23 is released, and the first flywheel 71 is in a state in which the first flywheel 71 idles with respect to the first rotation shaft 23 (non-connection state).

The second flywheel 72 is connected to the second rotation shaft 33 and absorbs a torque fluctuation generated in the second gas turbine element 3. The second flywheel 72 is formed in a disc shape coaxial with the second rotation shaft 33. A configuration of the second flywheel is the same as the configuration of the first flywheel. The second flywheel 72 is provided at an end portion of the second rotation shaft 33. Specifically, the second flywheel 72 of the present embodiment is provided at the end portion of the second rotation shaft 33 that protrudes from the second compressor 31 on a side opposite to the second turbine 32. In other words, the second flywheel 72 is provided on the side opposite to the second turbine 32 with respect to the second compressor 31.

A second clutch 74 is provided between the second flywheel 72 and the second compressor 31. The second clutch 74 is provided on the second rotation shaft 33. The second clutch 74 is switched between a connection state in which the second flywheel 72 and the second rotation shaft 33 are connected to each other, and a non-connection state in which the connection between the second flywheel 72 and the second rotation shaft 33 is released. The second clutch 74 is, for example, an electromagnetic clutch. When the electromagnetic clutch is turned on, the second flywheel 72 and the second rotation shaft 33 are connected to each other (connection state). When the electromagnetic clutch is turned off, the connection between the second flywheel 72 and the first rotary shaft 23 is released, and the second flywheel 72 is in a state in which the second flywheel 72 idles with respect to the second rotation shaft 33 (non-connection state).

Figure 3:
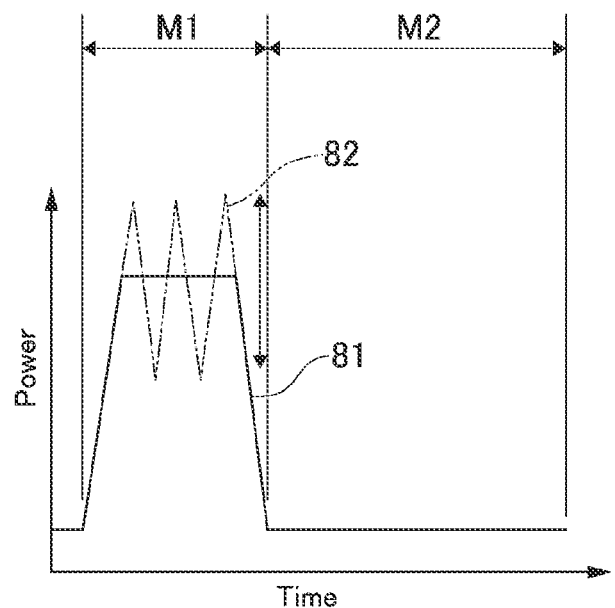
FIG. 3 is a graph showing a fluctuating load of the aircraft according to the first embodiment.

FIG. 3 is a graph showing a fluctuating load 82 of the aircraft 10 according to the first embodiment.

As shown in FIG. 3, a basic load 81 is determined in the aircraft 10 on which the gas turbine generator 1 is mounted in accordance with a flight state of the aircraft 10. The basic load 81 is a load applied to the gas turbine generator 1 when, for example, the aircraft 10 performs various operations such as cruising, taking off and landing, and hovering. For example, a basic load 81 when the aircraft 10 takes off and lands is larger than a basic load 81 when the aircraft 10 is cruising.

Here, when the aircraft 10 actually flies, in addition to the basic load 81, a fluctuating load 82 that oscillates at a short period may act on a propeller due to disturbance of outside air or the like. Alternatively, the fluctuating load 82 may act when the attitude is controlled during hovering. The fluctuating load 82 is a difference from the basic load 81.

As shown in FIGS. 2 and 3, in the present embodiment, an output for the basic load 81 is provided by the generated power of the first generator 24 and the second generator 34. On the other hand, an output for the fluctuating load 82 is provided by the generated power based on moments of inertia of the first flywheel 71 and the second flywheel 72. Accordingly, when the first flywheel 71 and the first rotation shaft 23 are connected to each other via the first clutch 73, the fluctuating load 82 is absorbed using the moment of inertia of the first flywheel 71. Similarly, when the second flywheel 72 and the second rotation shaft 33 are connected to each other via the second clutch 74, the fluctuating load 82 is absorbed using the moment of inertia of the second flywheel 72.

Also, in the present embodiment, the electric power generated by each generator is charged to the battery 17, and the electric power is supplied from the battery 17 to the rotors (propellers) via the inverter 18, but the battery 17 may be omitted. That is, if the first flywheel 71 and the second flywheel 72 can absorb the entire fluctuating load 82, the battery 17 for absorbing the fluctuating load 82 may not be provided.

In the present embodiment, when the engine is started from a state in which the engine is stopped, the first clutch 73 and the second clutch 74 are controlled to be in the non-connection state. That is, when the engine is started, the first flywheel 71 and the second flywheel 72 are not connected to the first rotation shaft 23 and the second rotation shaft 33.

(Operation Mode of Gas Turbine Generator)

Next, an operation mode of the gas turbine generator 1 will be described. The plurality of opening and closing valves 6 described above are controlled to be independently openable and closable by a control unit (not shown). The control unit transmits a signal to each opening and closing valve 6 using an electrical method, for example. The plurality of opening and closing valves 6 are switched to an open state or a closed state depending on a received signal. The control unit identifies that the aircraft 10 is in a predetermined operation mode based on state information of the aircraft 10, operation information from a pilot, and the like and opens and closes each opening and closing valve 6 in a predetermined combination in accordance with a type of the specified operation mode. In the present embodiment, the control unit can specify at least two operation modes of a first operation mode M1 and a second operation mode M2.

An operation of the gas turbine generator 1 in each operation mode will be described below.

First, an operation of the gas turbine generator 1 in the first operation mode M1 will be described. The first operation mode M1 is an operation mode in a case in which required outputs for the first gas turbine element 2 and the second gas turbine element 3 are larger than a predetermined value. The required outputs are electric power required for the aircraft 10 to shift to a flight state in response to a control signal or maintain the flight state. As shown in FIG. 3, the first operation mode M1 is an operation mode corresponding to a high load such as when the aircraft 10 takes off and lands.

As shown in FIG. 2, in the first operation mode M1, the control unit opens the first opening and closing valve 61, the second opening and closing valve 62, the third opening and closing valve 63, and the fourth opening and closing valve 64. That is, a fluid (air or a combustion gas) can flow in all the pipes 5 of the first supply pipe 51, the second supply pipe 52, the first discharge pipe 53, and the second discharge pipe 54.

The first compressor 21 suctions in outside air and compresses the air. The air compressed by the first compressor 21 flows through the first supply pipe 51 and flows into the combustor 4. The second compressor 31 suctions in outside air and compresses the air. The air compressed by the second compressor 31 flows through the second supply pipe 52 and flows into the combustor 4. Thus, since the compressed air flows into the combustor 4 from each of the first compressor 21 and the second compressor 31, a sufficient flow of air is supplied to the combustor 4 to generate the required outputs.

About half of the combustion gas discharged from the combustor 4 flows through the first discharge pipe 53 and is supplied to the first turbine 22 to rotate the first turbine 22. After that, the combustion gas is discharged to the outside from the first turbine 22. The other half of the combustion gas discharged from the combustor 4 flows through the second discharge pipe 54 and is supplied to the second turbine 32 to rotate the second turbine 32. After that, the combustion gas is discharged to the outside from the second turbine 32. The first turbine 22 and the second turbine 32 rotate, and thus the first generator 24 and the second generator 34 are rotationally driven to generate electric power.

Next, an operation of the gas turbine generator 1 in the second operation mode M2 will be described. The second operation mode M2 is an operation mode in which an output value is smaller than a predetermined value.

In the second operation mode M2, the control unit stops an operation of one of the first gas turbine element 2 and the second gas turbine element 3 and closes the opening and closing valves 6 provided in the supply pipe and the discharge pipe connected to the stopped gas turbine element. Here, a case in which the operation of the second gas turbine element 3 is stopped will be described. The control unit closes the opening and closing valves 6 provided in the second supply pipe 52 and the second discharge pipe 54 connected to the stopped second gas turbine element 3. Specifically, the control unit opens the first opening and closing valve 61 and the third opening and closing valve 63 and closes the second opening and closing valve 62 and the fourth opening and closing valve 64. Thus, the control unit stops the operation of the second gas turbine element 3 and operates the first gas turbine element 2.

In the second operation mode M2, the first compressor 21 suctions in outside air and compresses the air. The air compressed by the first compressor 21 flows through the first supply pipe 51 and flows into the combustor 4. The combustion gas discharged from the combustor 4 flows through the first discharge pipe 53 and is supplied to the first turbine 22 to rotate the first turbine 22. After that, the combustion gas is discharged to the outside from the first turbine 22.

Operations and Effects

Next, operations and effects of the gas turbine generator 1 described above will be described.

According to the gas turbine generator 1 of the present embodiment, the gas turbine generator 1 is the multi-type gas turbine generator 1 including the two gas turbine elements and the single combustor 4. Since the plurality of gas turbine elements 2 and 3 are connected to the single combustor 4, the number of parts can be reduced as compared with conventional technique having a plurality of combustors corresponding to the plurality of gas turbine elements 2 and 3. Thus, it is possible to inhibit an increase in weight of the entire gas turbine generator 1. By reducing the weight of the gas turbine generator 1, it is possible to improve fuel efficiency and reduce an unnecessary fuel loss from the battery 17. Accordingly, the battery 17 can be made smaller.

The gas turbine generator 1 has the flywheel 7. The flywheel 7 is connected to the rotation shaft and absorbs the torque fluctuation (fluctuating load 82) generated in the connected gas turbine element. The flywheel 7 generates the moment of inertia by rotating with the rotation shaft. For this reason, various fluctuating loads 82 generated in the aircraft 10 can be absorbed by using the generated power based on the moment of inertia of the flywheel 7. Thus, as compared with conventional technique in which the fluctuating load 82 is absorbed using the electric power generated from the battery 17, it is possible to inhibit unnecessary power consumption of the battery 17 for coping with the fluctuating load 82. Accordingly, a capacity of the battery 17 can be reduced as compared with conventional technique. As a result, the battery 17 can be made smaller and lighter, and an increase in cost related to the battery 17 can be inhibited. In particular, in the multi-type gas turbine generator 1 including the plurality of gas turbine elements, the weight of the entire battery 17 can be reduced as compared with conventional technique.

Accordingly, it is possible to provide the gas turbine generator 1 in which the battery 17 can be made smaller and the weight of the battery 17 can be reduced as compared with conventional technique.

The gas turbine generator 1 has the first flywheel 71 and the second flywheel 72. The first flywheel 71 is connected to the first rotation shaft 23 and absorbs the torque fluctuation (fluctuating load 82) generated in the first gas turbine element 2.

The second flywheel 72 is connected to the second rotation shaft 33 and absorbs the torque fluctuation (fluctuating load 82) generated in the second gas turbine element 3. Since the flywheel 7 is provided for each of the plurality of gas turbine elements 2 and 3 in this way, the fluctuating load 82 in the plurality of gas turbine elements 2 and 3 can be effectively absorbed. For example, even in a case in which one gas turbine element (the second gas turbine element 3 in this embodiment) is stopped, the fluctuating load 82 can be absorbed by the flywheel 7 provided in the first gas turbine element 2 in operation. Accordingly, particularly in the multi-type gas turbine generator 1, the gas turbine generator 1 that can cope with various situations can be provided.

The first rotation shaft 23 is provided with the first clutch 73, and the second rotation shaft 33 is provided with the second clutch 74. The clutches 73 and 74 can switch between the connection state in which the flywheel 7 and the rotation shaft are connected to each other and the non-connection state in which the connection between the flywheel 7 and the rotation shaft is released. Since contact and non-contact of the flywheel 7 to the rotation shafts 23 and 33 can be switched by the clutches 73 and 74, the moment of inertia of the flywheel 7 can be effectively used in accordance with the flight state of the aircraft 10. Accordingly, versatility of the gas turbine generator 1 can be improved. When the engine is started, the clutches 73 and 74 are in the non-connection state. By placing the clutches 73 and 74 in the non-connection state, the moment of inertia of each of the rotation shafts 23 and 33 is reduced, and thus the gas turbine engine can be easily accelerated. Accordingly, a time required to start the engine can be shortened.

The first supply pipe 51, the second supply pipe 52, the first discharge pipe 53, and the second discharge pipe 54 are provided respectively with the first opening and closing valve 61, the second opening and closing valve 62, the third opening and closing valve 63, and the fourth opening and closing valve 64. The aircraft 10 can be switched between the first operation mode M1 in which the required output is large, and the second operation mode M2 in which the required output is small Thus, the gas turbine generator 1 can be used in an optimum form for each of the plurality of operation modes, for example, at the time of a high load such as when the aircraft 10 takes off and lands and at the time of a low load such as when the aircraft 10 is cruising. Accordingly, fuel efficiency of the gas turbine generator 1 can be improved as compared with conventional technique.

In particular, in the second operation mode M2 corresponding to a low load, one of the two gas turbine elements 2 and 3 (the second gas turbine element 3 in the present embodiment) is stopped. In this case, the opening and closing valves 6 provided in the respective pipes 5 connected to the stopped second gas turbine element 3 are closed. Thus, excessive power generation of the battery 17 can be inhibited by switching the mode to the second operation mode M2 at the time of a low load, for example, when the aircraft 10 is cruising. Accordingly, the battery 17 can be made smaller and lighter.

The basic load 81 is determined in accordance with the flight state of the aircraft 10. The output for the basic load 81 is provided by the generated power of the first generator 24 and the second generator 34. The output for the fluctuating load 82, which is the difference from the basic load 81, is provided by the generated power based on the moment of inertia of the flywheel 7. Thus, since the fluctuating load 82 can be absorbed only by the flywheel 7, no battery 17 is required. Accordingly, a battery-less gas turbine generator 1 can be provided. Thus, the weight of the gas turbine generator 1 can be further reduced.

Second Embodiment

Figure 4:
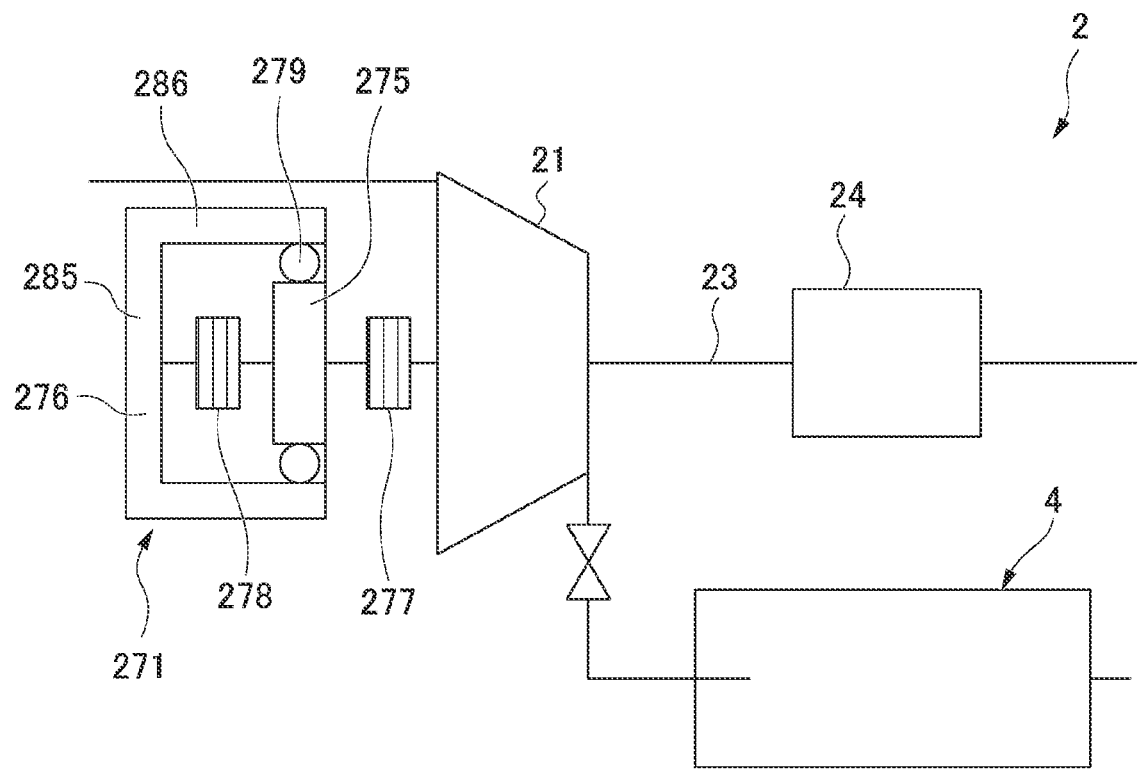
FIG. 4 is a schematic configuration diagram showing a configuration of a variable flywheel in a gas turbine generator according to a second embodiment.

Next, a second embodiment according to the present invention will be described. FIG. 4 is a schematic configuration diagram showing a configuration of a variable flywheel in a gas turbine generator 1 according to a second embodiment. In the following description, the same constituent elements as those in the first embodiment described above will be denoted by the same reference numerals, and the description thereof will be appropriately omitted. The present embodiment is different from the first embodiment described above in that the flywheel 7 is a variable flywheel.

In the second embodiment, a first flywheel 271 and a second flywheel 272 are variable flywheels in which a magnitude of a moment of inertia changes. Since the first flywheel 271 and the second flywheel 272 have the same configuration, the first flywheel 271 will be described below, and the description of the second flywheel 272 will be omitted. Hereinafter, the first flywheel 271 may be simply referred to as a flywheel 271.

The flywheel 271 has an inner flywheel 275 and an outer flywheel 276. The inner flywheel 275 and the outer flywheel 276 are provided on a side opposite to the first turbine 22 with respect to the first compressor 21. The inner flywheel 275 is a flywheel with a relatively small moment of inertia. The inner flywheel 275 is provided on the first rotation shaft 23 that protrudes from the first compressor 21 on the side opposite to the first turbine 22. The inner flywheel 275 is formed in a disc shape coaxial with the first rotation shaft 23. The inner flywheel 275 is connected to the first rotation shaft 23 via an inner side clutch 277.

The inner side clutch 277 is provided between the inner flywheel 275 and the first compressor 21. The inner side clutch 277 is provided on the first rotation shaft 23. The inner side clutch 277 switches between a connection state in which the inner flywheel 275 and the first rotation shaft 23 are connected to each other and a non-connection state in which the connection between the inner flywheel 275 and the first rotation shaft 23 is released.

The outer flywheel 276 is a flywheel with a larger moment of inertia than the inner flywheel 275. The outer flywheel 276 is provided on a side opposite to the first compressor 21 with respect to the inner flywheel 275. The outer flywheel 276 is formed in a cylindrical shape coaxial with the first rotation shaft 23. The outer flywheel 276 is connected to the first rotation shaft 23 via an outer side clutch 278.

Specifically, the outer flywheel 276 is formed in a bottomed cylindrical shape having a bottom portion 285 and a side portion 286, and one opening portion. The bottom portion 285 is formed in a disc shape orthogonal to the first rotation shaft 23 and coaxial with the first rotation shaft 23. The bottom portion 285 is provided at a distance from the inner flywheel 275 in the axial direction of the first rotation shaft 23. The side portion 286 extends from an outer circumferential portion of the bottom portion 285 toward the inner flywheel 275 side in the axial direction of the first rotation shaft 23. The side portion 286 is formed in an annular shape coaxial with the first rotation shaft 23. A bearing 279 is inserted into an inner circumferential surface of the side portion 286. The inner flywheel 275 is attached on an inner side of the bearing 279. That is, the inner flywheel 275 is disposed inside the outer flywheel 276. An inner circumferential surface of the outer flywheel 276 and an outer circumferential surface of the inner flywheel 275 are connected to each other via the bearing 279 to be rotatable relative to each other.

The outer side clutch 278 is provided between the bottom portion 285 of the outer flywheel 276 and the inner flywheel 275. The outer side clutch 278 is provided on the first rotation shaft 23. The outer side clutch 278 switches between a connection state in which the outer flywheel 276 and the first rotation shaft 23 are connected to each other, and a non-connection state in which the connection between the outer flywheel 276 and the first rotation shaft 23 is released. In the present embodiment, the outer side clutch 278 and the inner side clutch 277 are disposed coaxially, and the inner side clutch 277 and the outer side clutch 278 are disposed in the order of proximity to the first compressor 21. For this reason, in order to connect the outer flywheel 276 to the first rotation shaft 23, it is necessary to place both of the inner side clutch 277 and the outer side clutch 278 in the connection state.

For example, in a case in which the fluctuating load 82 is small or at an initial stage when the engine is started, the inner side clutch 277 is turned on and the outer side clutch 278 is turned off. Thus, only the inner flywheel 275 is connected to the first rotation shaft 23.

On the other hand, for example, in a case in which the fluctuating load 82 is large or the engine is in steady operation, the inner side clutch 277 and the outer side clutch 278 are turned on. Thus, both of the inner flywheel 275 and the outer flywheel 276 are connected to the first rotation shaft 23. Accordingly, a large moment of inertia can be obtained as compared with a case in which only the inner flywheel 275 is connected to the first rotation shaft 23.

According to the second embodiment, the first flywheel 271 and the second flywheel 72 are variable flywheels in which the magnitude of the moment of inertia changes. Thus, the magnitude of the moment of inertia can be changed in accordance with a magnitude of the fluctuating load 82 and a length of time during which the fluctuating load 82 is generated. Accordingly, it is possible to more accurately cope with the fluctuating load 82 generated in the aircraft 10. Further, by optimizing the magnitude of the moment of inertia, efficiency of the gas turbine generator 1 can be improved, and unnecessary power consumption of the battery 17 can be further inhibited.

Third Embodiment

Next, a third embodiment according to the present invention will be described. The present embodiment is different from the above-described first embodiment in that the present invention is applied to a normal-side gas turbine generator in which one combustor is provided for one gas turbine element.

In the third embodiment, the gas turbine generator is a normal-type gas turbine generator including one gas turbine element, one combustor for one gas turbine engine, and a flywheel.

The gas turbine element has a compressor, a turbine, a rotation shaft, and a generator. Since configurations of the compressor, the turbine, the rotation shaft, and the generator of the gas turbine element in the third embodiment are the same as the first compressor 21, the first turbine 22, the first rotation shaft 23, and the first generator 24 in the first gas turbine element 2 of the first embodiment, the description thereof will be omitted.

The combustor is connected to the compressor and the turbine. Air compressed by the compressor flows into the combustor. Combustion gas discharged from the combustor is supplied to the turbine, rotates the turbine, and then is discharged from the turbine to the outside.

The flywheel is connected to the rotation shaft of the gas turbine element and absorbs a torque fluctuation generated by the gas turbine generator. The flywheel is formed, for example, in a disc shape coaxial with the rotation shaft. The flywheel is provided, for example, at an end portion of the rotation shaft that protrudes from the compressor on a side opposite to the first turbine. In other words, the flywheel is located on the side opposite to the turbine with respect to the compressor.

An electromagnetic clutch is provided between the flywheel and the compressor. The electromagnetic clutch is provided on the rotation shaft. The electromagnetic clutch switches between a connection state in which the flywheel and the rotation shaft are connected to each other, and a non-connection state in which the connection between the flywheel and the rotation shaft is released. When the electromagnetic clutch is turned on, the flywheel and the rotation shaft are connected to each other (connection state). When the electromagnetic clutch is turned off, the connection between the flywheel and the rotation shaft is released, and the flywheel is in a state in which the flywheel idles with respect to the rotation shaft (non-connection state).

As shown in FIG. 3, in the aircraft 10 on which the normal-type gas turbine generator of the third embodiment is mounted, the basic load 81 is determined in accordance with the flight state of the aircraft 10. The basic load 81 is a load applied to the gas turbine generator when, for example, the aircraft 10 performs various operations such as cruising, taking off and landing, and hovering. When the aircraft 10 actually flies, in addition to the basic load 81, the fluctuating load 82 that oscillates at a short period may act on a propeller due to disturbance of outside air or the like. Alternatively, the fluctuating load 82 may act when the attitude is controlled during hovering. The fluctuating load 82 is a difference from the basic load 81.

In the third embodiment, the output for the basic load 81 is provided by electric power generated by the generator. On the other hand, the output for the fluctuating load 82 is provided by the generated electric power based on the moment of inertia of the flywheel. Accordingly, when the flywheel and the rotation shaft are connected to each other via the electromagnetic clutch, the fluctuating load is absorbed using the moment of inertia of the flywheel.

According to the third embodiment, even when being applied to a normal-type gas turbine generator including a single gas turbine element and a combustor, the same operations and effects as those of the above-mentioned multi-type gas turbine generator 1 can be obtained. That is, by absorbing the fluctuating load 82 using the flywheel, power consumption of the battery can be inhibited and capacity of the battery can be reduced as compared with conventional technique. As a result, the battery can be made smaller and lighter.

Accordingly, it is possible to provide the gas turbine generator in which the battery can be made smaller and the weight of the battery can be reduced as compared with conventional technique.

Also, the technical scope of the present invention is not limited to the above-described embodiments, and various changes can be made without departing from the spirit of the present invention.

For example, in the above-mentioned first embodiment, the case in which the operation of the second gas turbine element 3 is stopped has been described as the second operation mode M2, but the present invention is not limited thereto. In the second operation mode M2, the operation of the first gas turbine element 2 may be stopped and the second gas turbine element 3 may be operated. In this case, the control unit opens the second opening and closing valve 62 and the fourth opening and closing valve 64 and closes the first opening and closing valve 61 and the third opening and closing valve 63.

In the first embodiment, the gas turbine generator 1 may have a plurality of gas turbine elements of three or more.

The flywheel 7 may be provided at end portions of the rotation shafts 23 and 33 that protrude on the side opposite respectively to the compressors 21 and 31 for the turbines 22 and 32. In other words, the flywheel 7 may be provided on a side opposite to each of the compressors 21 and 31 with respect to the turbines 22 and 32. The flywheel 7 may be provided between the compressors 21 and 31 and the turbines 22 and 32 in the axial direction of the rotation shafts 23 and 33, for example.

In the second embodiment, the inner side clutch 277 may not be provided. In this case, since the inner flywheel 275 always rotates integrally with the first rotation shaft 23, it is preferable to have a relatively small moment of inertia not to affect start of the engine.

The configuration of the variable clutch is not limited to the above-described embodiments.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Gas turbine generator
2 First gas turbine element
3 Second gas turbine element
4 Combustor
7 Flywheel
10 Aircraft
12 Rotor
21 First compressor
22 First turbine
23 First rotation shaft
24 First generator
31 Second compressor
32 Second turbine
33 Second rotation shaft
34 Second generator
40 Intake port
51 First supply pipe
52 Second supply pipe
53 First discharge pipe
54 Second discharge pipe
61 First opening and closing valve
62 Second opening and closing valve
63 Third opening and closing valve
64 Fourth opening and closing valve
71, 271 First flywheel
72 Second flywheel
73 First clutch
74 Second clutch
81 Basic load
82 Fluctuating load
M1 First operation mode
M2 Second operation mode

What is claimed is:
1. A gas turbine generator which is mounted on an airframe of an aircraft having a hybrid propulsion system including a plurality of rotors that are connected to a generator to drive the generator and driven by electric power generated by the generator, comprising:
- a first gas turbine element including a first compressor, a first turbine that rotates integrally with the first compressor, a first rotation shaft that connects the first compressor to the first turbine, and a first generator that is connected to the first rotation shaft and disposed between the first compressor and the first turbine;
- a second gas turbine element including a second compressor, a second turbine that rotates integrally with the second compressor, a second rotation shaft that connects the second compressor to the second turbine, and a second generator that is connected to the second rotation shaft and disposed between the second compressor and the second turbine;
- a single combustor connected to the first gas turbine element and the second gas turbine element;
- a first supply pipe that connects the first compressor to the combustor and allows air compressed by the first compressor to flow into an intake port of the combustor;
- a second supply pipe that connects the second compressor to the combustor and allows air compressed by the second compressor to flow into the intake port of the combustor;
- a first discharge pipe that connects the combustor to the first turbine and allows combustion gas discharged from the combustor to flow into the first turbine;
- a second discharge pipe that connects the combustor to the second turbine and allows combustion gas discharged from the combustor to flow into the second turbine; and
- a flywheel that is connected to at least one of the first rotation shaft and the second rotation shaft and absorbs torque fluctuation generated in the connected gas turbine element.

2. The gas turbine generator according to claim 1 further comprising:
- a first flywheel which is connected to the first rotation shaft and absorbs torque fluctuation that is generated in the first gas turbine element; and
- a second flywheel which is connected to the second rotation shaft and absorbs torque fluctuation that is generated in the second gas turbine element.

3. The gas turbine generator according to claim 2 further comprising:
- a first clutch that is provided on the first rotation shaft to switch between a connection state in which the first flywheel and the first rotation shaft are connected to each other and a non-connection state in which the connection between the first flywheel and the first rotation shaft is released; and
- a second clutch that is provided on the second rotation shaft to switch between a connection state in which the second flywheel and the second rotation shaft are connected to each other and a non-connection state in which the connection between the second flywheel and the second rotation shaft is released,
- wherein the first clutch and the second clutch are placed in the non-connection state when an engine is started.

4. The gas turbine generator according to claim 2, wherein the first flywheel and the second flywheel are variable flywheels in which a magnitude of a moment of inertia changes.

5. The gas turbine generator according to claim 1 further comprising:
- a first opening and closing valve that is provided to the first supply pipe and capable of blocking the flow of air in the first supply pipe;
- a second opening and closing valve that is provided to the second supply pipe and capable of blocking the flow of air in the second supply pipe;
- a third opening and closing valve that is provided to the first discharge pipe and capable of blocking the flow of combustion gas in the first discharge pipe; and
- a fourth opening and closing valve that is provided to the second discharge pipe and capable of blocking the flow of combustion gas in the second discharge pipe,
- wherein the aircraft is switchable between a first operation mode in which required outputs for the first gas turbine element and the second gas turbine element are larger than a predetermined value, and a second operation mode in which the required outputs are smaller than the predetermined value, and
- in the second operation mode, an operation of either the first gas turbine element or the second gas turbine element is stopped, and the opening and closing valves provided to the supply pipe and the discharge pipe connected to the stopped gas turbine element are closed.

6. The gas turbine generator according to claim 1,
- wherein a basic load is determined in accordance with a flight state of the aircraft, and
- an output for the basic load is provided by the generated electric power of the first generator and the second generator, and an output for a fluctuating load, which is a difference from the basic load, is provided by the generated electric power based on the moment of inertia of the flywheel.

7. A gas turbine generator which is mounted on an airframe of an aircraft having a hybrid propulsion system including a plurality of rotors that are connected to a generator to drive the generator and driven by electric power generated by the generator, comprising:
- a compressor;
- a turbine that rotates integrally with the compressor;
- a rotation shaft that connects the compressor to the turbine;
- a generator connected to the rotation shaft;
- a combustor connected to the compressor and the turbine; and
- a flywheel that is connected to the rotation shaft and absorbs torque fluctuation generated by the gas turbine generator,
- wherein a basic load is determined in accordance with a flight state of the aircraft,
- an output for the basic load is provided by generated electric power of the generator, and
- an output for a fluctuating load, which is a difference from the basic load, is provided by the generated electric power based on a moment of inertia of the flywheel.

* * * * *